(12) United States Patent
Murphy

(10) Patent No.: US 7,341,397 B2
(45) Date of Patent: Mar. 11, 2008

(54) UTILITY TRAILER AND SAFETY BARRIER FOR STREET REPAIR

(76) Inventor: William T. Murphy, 305 W. 31st Ave., Spokane, WA (US) 99203

( * ) Notice: Subject to any disclaimer, the term of this patent is extended or adjusted under 35 U.S.C. 154(b) by 371 days.

(21) Appl. No.: 11/182,652

(22) Filed: Jul. 18, 2005

(65) Prior Publication Data

US 2007/0012534 A1    Jan. 18, 2007

(51) Int. Cl.
*B60R 19/18*   (2006.01)
*E01F 13/12*   (2006.01)
*F16F 7/12*    (2006.01)

(52) U.S. Cl. .................... 404/6; 293/132; 188/377

(58) Field of Classification Search ............... 404/6, 404/9–12
See application file for complete search history.

(56) References Cited

U.S. PATENT DOCUMENTS

| | | | | |
|---|---|---|---|---|
| 626,480 A * | 6/1899 | Bemelmans | ................ | 293/27 |
| 2,984,512 A * | 5/1961 | Shaginaw | ................ | 293/119 |
| 3,598,260 A * | 8/1971 | Hutson | ................ | 414/550 |
| 3,622,980 A * | 11/1971 | Elledge, Jr. | ................ | 315/323 |
| 3,761,890 A * | 9/1973 | Fritts et al. | ................ | 340/473 |
| 4,060,255 A * | 11/1977 | Zimmerman | ............ | 280/478.1 |
| 4,077,144 A * | 3/1978 | Smits | ................ | 40/590 |
| 4,385,771 A * | 5/1983 | Eckels | ................ | 280/400 |
| 4,593,265 A * | 6/1986 | McKenney | ............ | 340/908.1 |
| 4,600,178 A * | 7/1986 | Zucker et al. | ................ | 256/1 |
| 5,199,755 A * | 4/1993 | Gertz | ................ | 293/120 |
| 5,248,129 A * | 9/1993 | Gertz | ................ | 256/13.1 |
| 5,475,386 A * | 12/1995 | Luoma | ................ | 340/908 |
| 6,364,400 B1* | 4/2002 | Unrath | ................ | 296/1.05 |
| 6,496,123 B2* | 12/2002 | Brinkman | ............ | 340/908 |
| 6,523,872 B2* | 2/2003 | Breed | ................ | 293/119 |
| 6,866,284 B2* | 3/2005 | Carlsson | ................ | 280/474 |
| 7,125,198 B2* | 10/2006 | Schiefferly et al. | ............ | 404/6 |
| 2004/0251698 A1* | 12/2004 | Welch et al. | ................ | 293/133 |
| 2006/0151986 A1* | 7/2006 | Reid et al. | ................ | 280/784 |

* cited by examiner

*Primary Examiner*—Raymond W Addie
(74) *Attorney, Agent, or Firm*—William A. Jeckle; Keith S. Bergman

(57) ABSTRACT

A utility trailer provides a frame defining a forward open bottom work space, a medially rearward deck and a rearwardmost extendable impact attenuator. Hitch structure encloses the forward portion of the work space. The impact attenuator is deployable spacedly rearwardly of the utility trailer in work site mode and provides frictional, mechanical and inertial devices to attenuate a forwardly directed impact. Additional impact attenuators extend between the hitch structure and a vehicle in towing motion. Plural jacks provide work site leveling and positional stability. The utility trailer provides an arch supported hoist to service the workspace and carries signs to provide traffic information and direction.

2 Claims, 7 Drawing Sheets

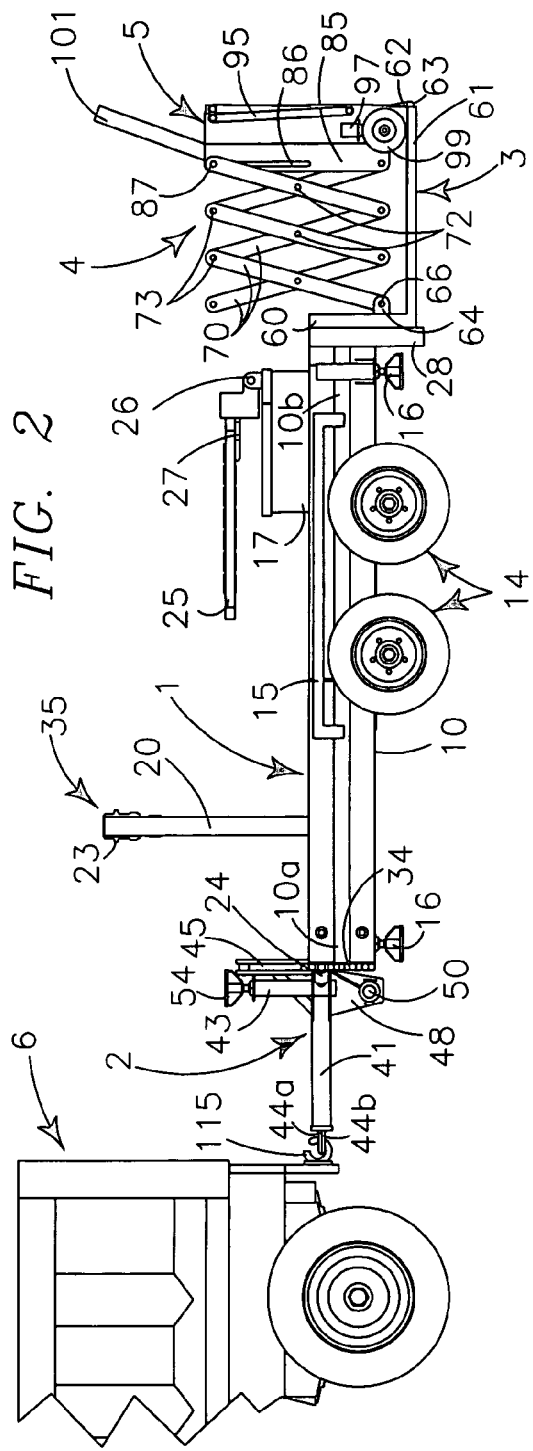
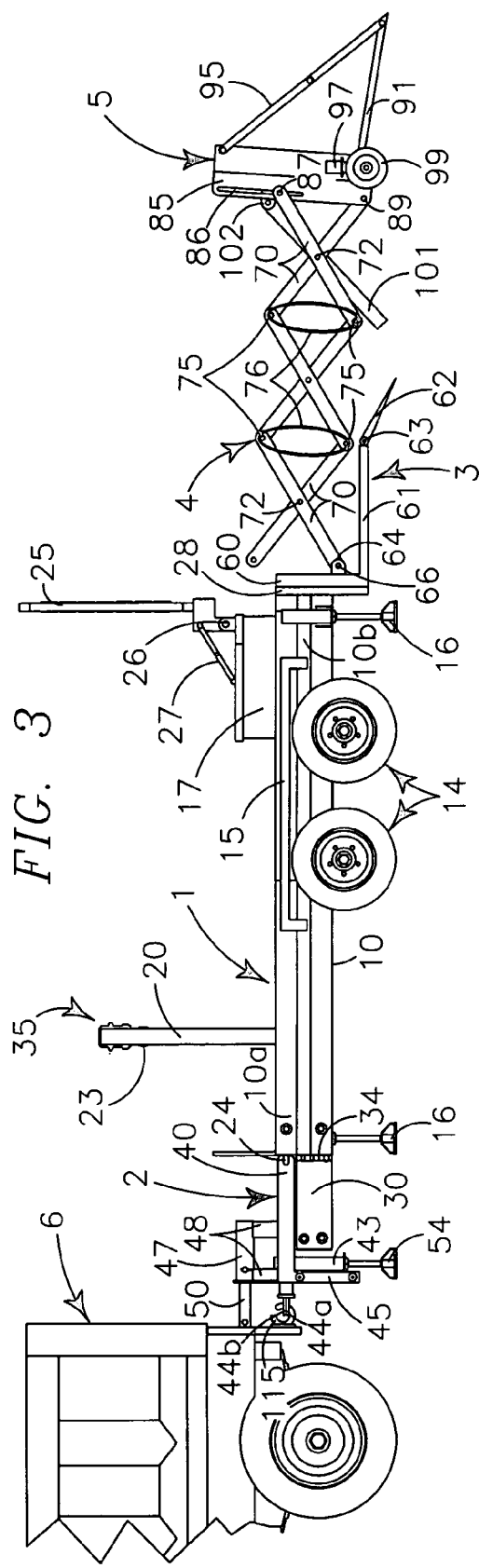

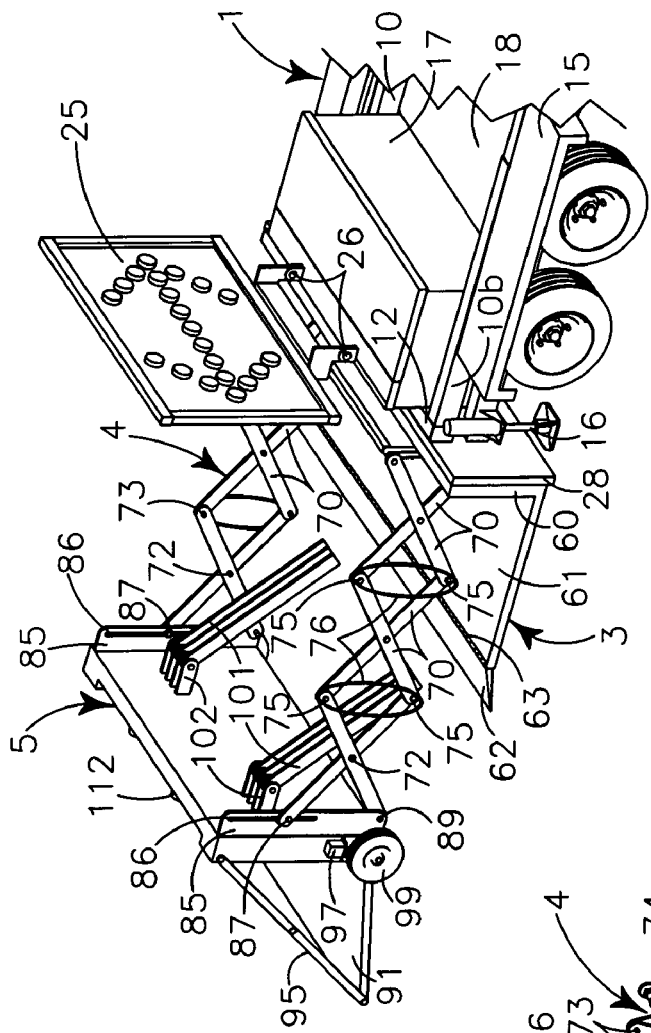
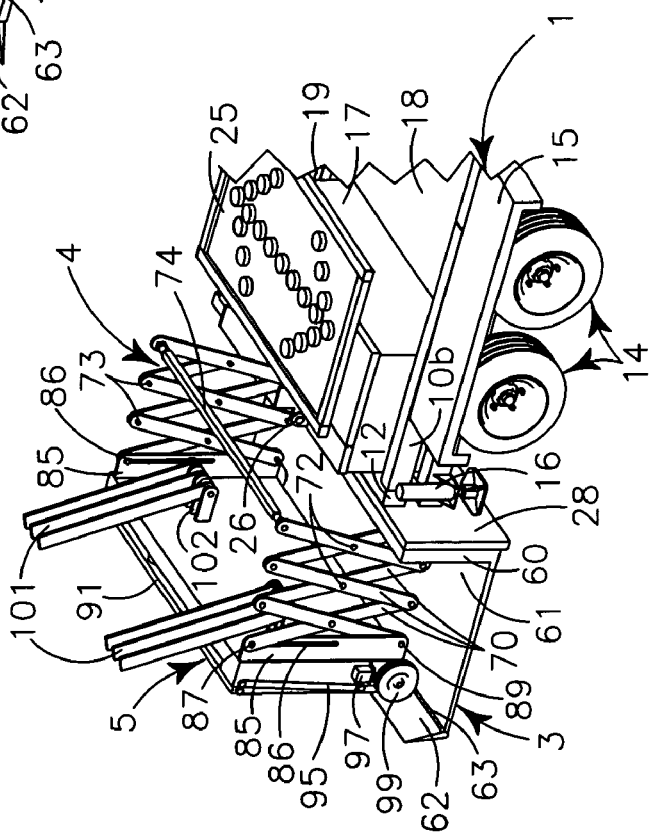

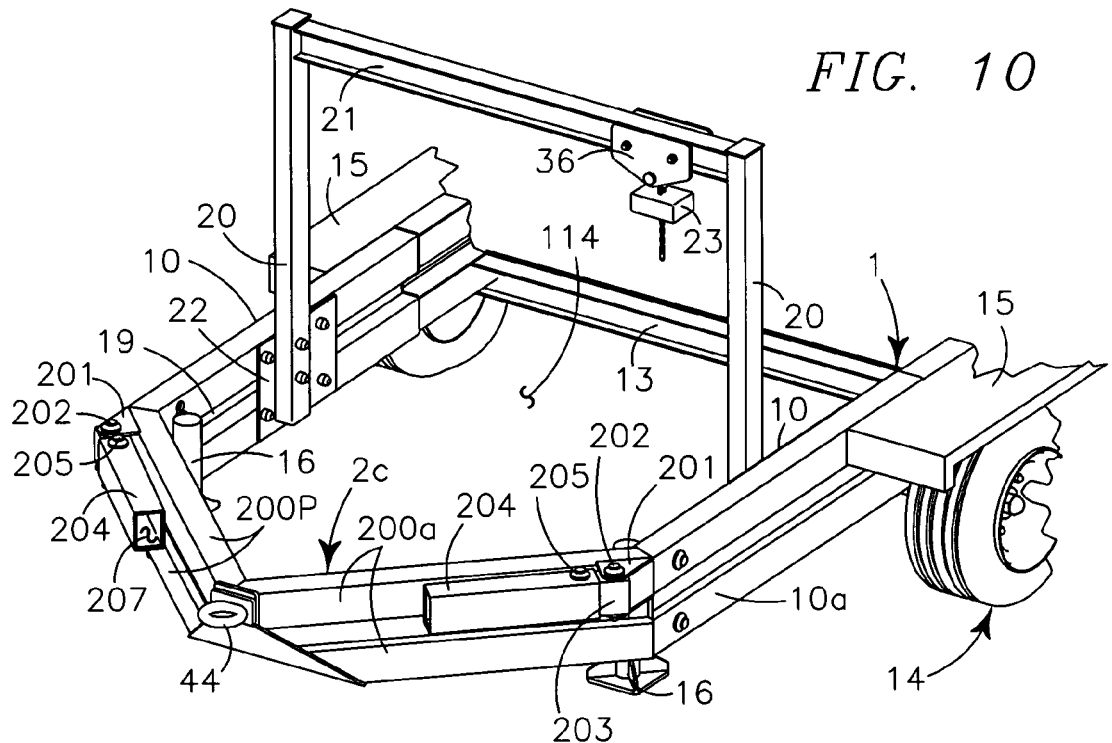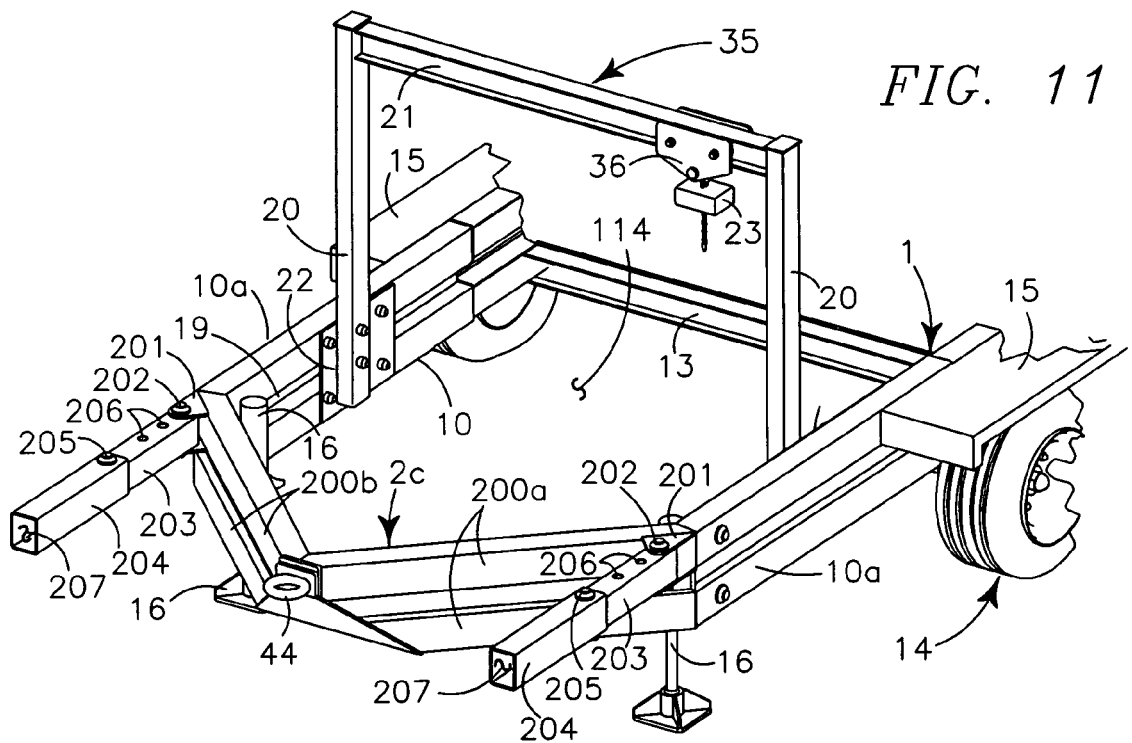

UTILITY TRAILER AND SAFETY BARRIER FOR STREET REPAIR

II. BACKGROUND OF INVENTION

IIA. Related Applications

There are no applications related hereto heretofore filed in this or in any foreign country.

IIB. Field of Invention

My invention relates generally to vehicular equipment used for road maintenance and road repair and more particularly to a towable utility trailer having traffic direction devices, a barrier protected work area, storage areas, and force attenuating devices.

IIC. Background and Description of Prior Art

Road maintenance is generally divided into categories of reconstruction and repair. Reconstruction is larger in scale and characterized by closure of the road to vehicular traffic for the period of reconstruction. Road repair is smaller in scale and vehicular traffic continues, but is detoured around the repair site by traffic markers and signage. A common example of road repair is the patching of potholes.

Road repair in general, and particularly pothole patching is dangerous because the operations take place on a normally freely travelable roadway with vehicular traffic moving thereabout which poses risks to road workers who might be struck by vehicles and to motorists who might strike road repair equipment with their vehicles. Because of the danger, the safety of road workers and of motorists is a primary concern of road repair operations. Various laws regulate the matter and State and Federal agencies have provided regulations establishing proper methods of warning motorists of road repair, directing traffic and protecting workers.

Repair of potholes presents particular problems because worker protection and traffic warning methods and apparatus for these operations must be portable and must not make small scale repairs inefficient or uneconomical.

Road repair operations have long used highly visible cones, signage, and traffic directional indicators to warn approaching motorists of and detour traffic around work sites. More recently, regulations have required road workers to wear brightly colored reflective vests as safety devices. However, cones, warning lights, signs and vests do not physically protect workers from vehicles, nor do they prevent workers from inadvertently moving into the path of vehicles properly passing adjacent to a work site.

Current safety practices do not eliminate the risk to workers because the practices are dependent upon the vigilance of both workers and motorists and unfortunately human frailties and distractions occasionally lead to lack of vigilance or periods of inattentiveness which may lead to catastrophic accidents.

The repair of potholes also requires extensive labor, equipment and supplies. Commonly a crew of 5 to 7 workers is used to repair potholes. Vehicular traffic is detoured around the repair site with traffic directing devices and directional and warning signs. The site to be repaired is surveyed and marked. At least one repair vehicle is positioned rearwardly of the work site to protect workers from approaching traffic while one or more other repair vehicles are positioned adjacent the work site to provide workers with access to supplies and tools and to move approaching vehicles from the normal traffic flow. The pothole is cut out with a jackhammer or saw to solid pavement or base material. Debris is removed and the cavity is cleaned with brooms, shovels and high-pressure air. The interior of the cavity is coated with heated tack oil. Hot asphaltic paving material is shoveled into the cavity, properly apportioned, configured and compacted with hand tools, followed by compaction with a vibratory compactor or rolling machine. The exposed patch surface is finally coated with an asphalt sealer.

My invention simplifies these procedures while making them safer by providing a towable utility trailer having a rearward deck for transport and storage of supplies and equipment and a forward peripherally protected work area. The utility trailer has a tow bar assembly that forms a protective boundary around the forward portion of the work area immediately behind the towing vehicle. The utility trailer carries at its rearward portion an energy absorbing impact attenuator which is connected to the utility trailer by an expanding telephone type linkage. The utility trailer and the impact attenuator carry lighted traffic indicators to warn approaching motorists and direct vehicular traffic around the worksite. My invention overcomes various of the disadvantages of the prior art by providing a utility trailer and safety barrier that protect workers while promoting efficiency by maintaining necessary tools and equipment available to workers, by being easily movable by a dump truck with a small work crew and by allowing utilization of ordinary equipment readily available to road repair crews.

My invention does not reside in any one of the foregoing features individually but rather in the synergistic combination of all of its structures which necessarily give rise to the functions flowing therefrom as hereinafter claimed.

III. SUMMARY OF INVENTION

My invention generally provides a utility trailer and safety barrier for street repair. The frame defines a rearward deck for tool and supply storage and transport and a forward work area protected by similar opposed side beams. A tow bar assembly provides a forward extension of the work area protected by a laterally extending forward peripheral structure. One or more wheel trucks support the utility trailer for towing by a vehicle. The frame carries ah optionally displayable lighted indicator panel for information and traffic direction. Extension mechanism at the rearward end portion of the frame interconnects an impact attenuator, which may be positioned on a road surface rearward of the utility trailer to attenuate impact forces if struck by an approaching vehicle and to carry an additional sign and traffic direction indicator.

In providing such advice, it is:

A principal object to provide a utility trailer and safety barrier for street repair that protects workers performing road repairs within an open bottom protected work area bounded by the utility trailer frame and tow bar assembly against vehicular intrusion.

A further object is to provide such a utility trailer that may have a compound tow bar assembly that pivots to form a forwardly extending protective boundary forwardly of the open bottom work area bounded by the utility trailer sides.

A further object is to provide such a utility trailer that has a deck to provide workers with access not only to supplies and materials carried on the bed portion of a towing vehicle but also to such materials carried on the deck of the utility trailer without requiring the workers to move outside the bounded protected work area.

It is a further object to provide such a utility trailer that carries an impact attenuator deployable upon a road surface spacedly rearwardly of a worksite by means of an expandable telephone type linkage.

It is a further object to provide such a utility trailer that has impact attenuators and energy absorbers in the utility trailer structure itself to further protect the work area.

A still further object is to provide such a utility trailer and safety barrier that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention, however, it is to be understood that its features are susceptible of change in design and structural arrangement with only one preferred and practical embodiment of the best known mode being illustrated in the accompanying drawings and specified herein as is required.

IV. BRIEF DESCRIPTION OF DRAWINGS

In the accompanying drawings which form a part hereof and wherein like numbers of reference refer to similar parts throughout:

FIG. 2 is an orthographic left side view of FIG. 1 with the safety barrier in towing configuration.

FIG. 3 is an orthographic left side view of the utility trailer of FIG. 1 with the safety barrier in a deployed worksite configuration.

FIG. 5 is a partial rearward looking top and right side isometric view of the utility trailer of FIG. 4.

FIG. 6 is a partial rearward looking top and right side isometric view of the utility trailer of FIG. 1.

FIG. 10 is a partial rearward looking top and left side isometric view of a second embodiment of stationary tow bar assembly for the utility trailer in a towing configuration with bracing members retracted inwardly.

FIG. 11 is a similar isometric view of the second embodiment of stationary tow bar assembly of FIG. 10 in a deployed worksite configuration with bracing members extended forwardly.

V. DESCRIPTION OF PREFERRED EMBODIMENT

Figure 1:
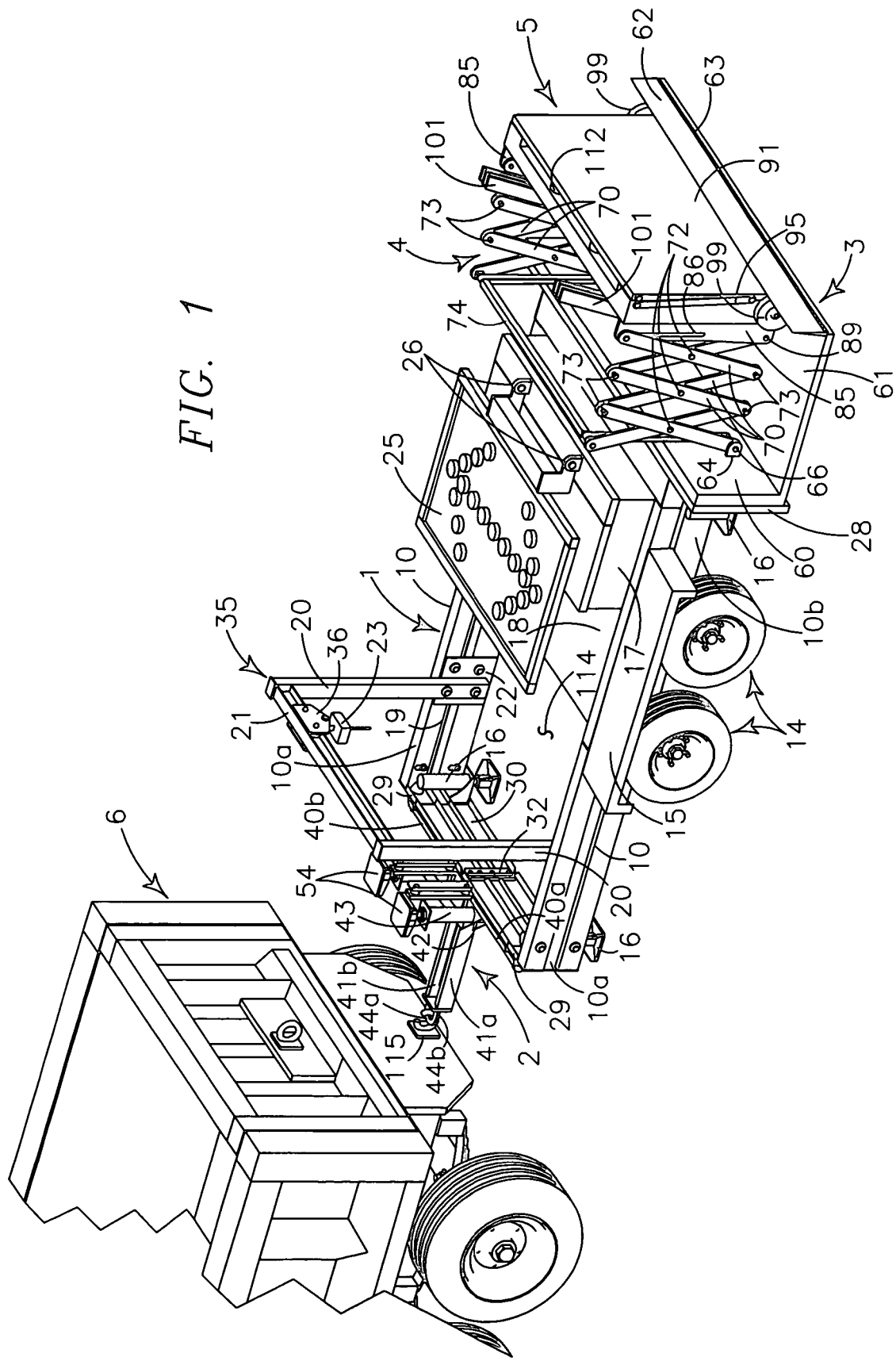
FIG. 1 is a forward looking top and left side isometric view of a first embodiment of my utility trailer in towing configuration showing various of its parts, their configuration and relationship.

As used herein, the term "forward", its derivatives, and grammatical equivalents refer to the portion of the utility trailer and its parts that are positioned closer to the front of the utility trailer. The term "rearward", its derivatives, and grammatical equivalents refer to the portion of the utility trailer and its parts that are positioned closer to the back of utility trailer. The term "outer", its derivatives, and grammatical equivalents refer to the lateral sides of the utility trailer as opposed to the medial portion of the utility trailer.

My utility trailer generally provides frame 1 carrying tow bar assembly 2 at a forward end portion and attenuator platform 3 at a rearward end portion. Telephone linkage 4 interconnects the attenuator platform 3 with deployable impact attenuator 5.

Figure 9:
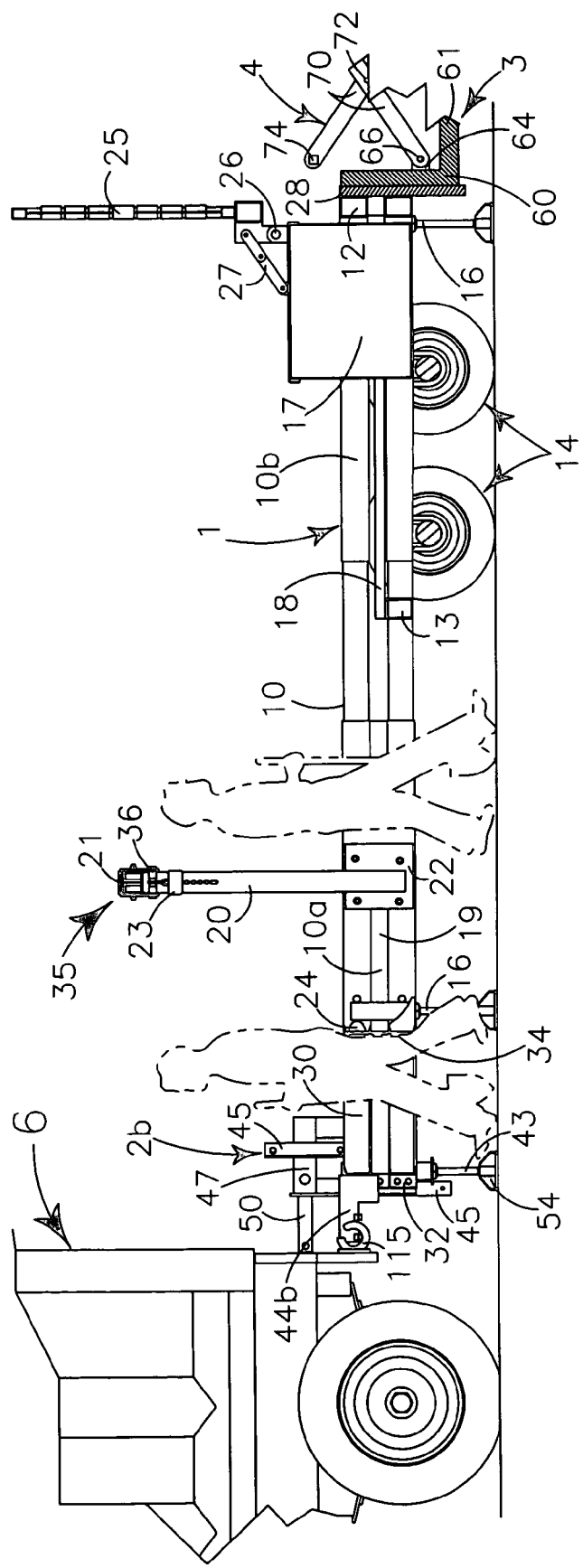
FIG. 9 is a medial vertical cross sectional view of the utility trailer of FIG. 4, taken on the Line 9-9 thereon in the direction indicated by the arrows, to show workers in phantom outline within the protected open bottom work area.

As seen in FIGS. 1 and 9, frame 1 is comprised of similar opposed side beams 10, having forward end portions 10a and opposed rearward end portions 10b structurally interconnected by rearmost cross beam 12 and medial cross beam 13 extending perpendicularly between side beams 10. Wheel truck 14 provides a suspension system, having at least one axle carrying at least two laterally opposed wheels, that is carried by frame 1 to depend therefrom to provide locomotion for my utility trailer by a towing vehicle. The wheels of the suspension system are covered on their upper surfaces by fenders 15 supported by frame 1.

Rearward deck 18 is carried on frame 1 to extend elongately from rearmost cross beam 12 forwardly to medial cross beam 13 and laterally between side beams 10. The rearward deck 18 may carry one or more cargo containers 17 of known construction for storage and transport of tools and supplies.

Leveling jacks 16 are structurally carried at forward end portions 10a and rearward end portions 10b of each side beam 10 to provide underlying support for the utility trailer and maintain frame 1 in a generally level orientation.

Similar opposed hoist arch rails 19, having an "I" beam cross-sectional configuration to define upper and lower channels (not shown), are structurally carried on the inner side of each side beam 10 to extend from forward end portion 10a to medial cross beam 13. A roller carriage 22 of known construction having plural roller wheels (not shown) engages with each opposed hoist arch rail 19 to move forwardly and rearwardly therealong.

A hoist arch having an inverted "U" configuration is formed by upper horizontal member 21, extending transversely across frame 1, and supported by two vertical members 20 depending from each lateral end of the upper horizontal member 21. Each parallel vertical member 20 is supported on the underlying roller carriage 22 engaged with hoist arch rails 19 to provide forward and rearward movement for the hoist arch. Hoist carriage 36 carrying depending hoist 23 of known construction is carried by and movable along horizontal member 21 to assist workers' moving of heavy objects.

Lighted traffic directional indicator panel 25 of known construction is carried on the rearward top edge of cargo container 17 by hinges 26 that permit the indicator panel 25 to be pivoted forwardly or rearwardly to a horizontal position to reduce its height and remove it from viewing position as required. Locking mechanism 27 (FIG. 9) carried by cargo container 17 secures indicator panel 25 in desired position. The lighted traffic directional indictor panel 25 has a plurality of lights operated by a known electronic controlling circuitry that activates the lights to simulate arrows moving left to right and right to left and provides other information and warning signals for vehicular traffic.

Figures 7, 8:
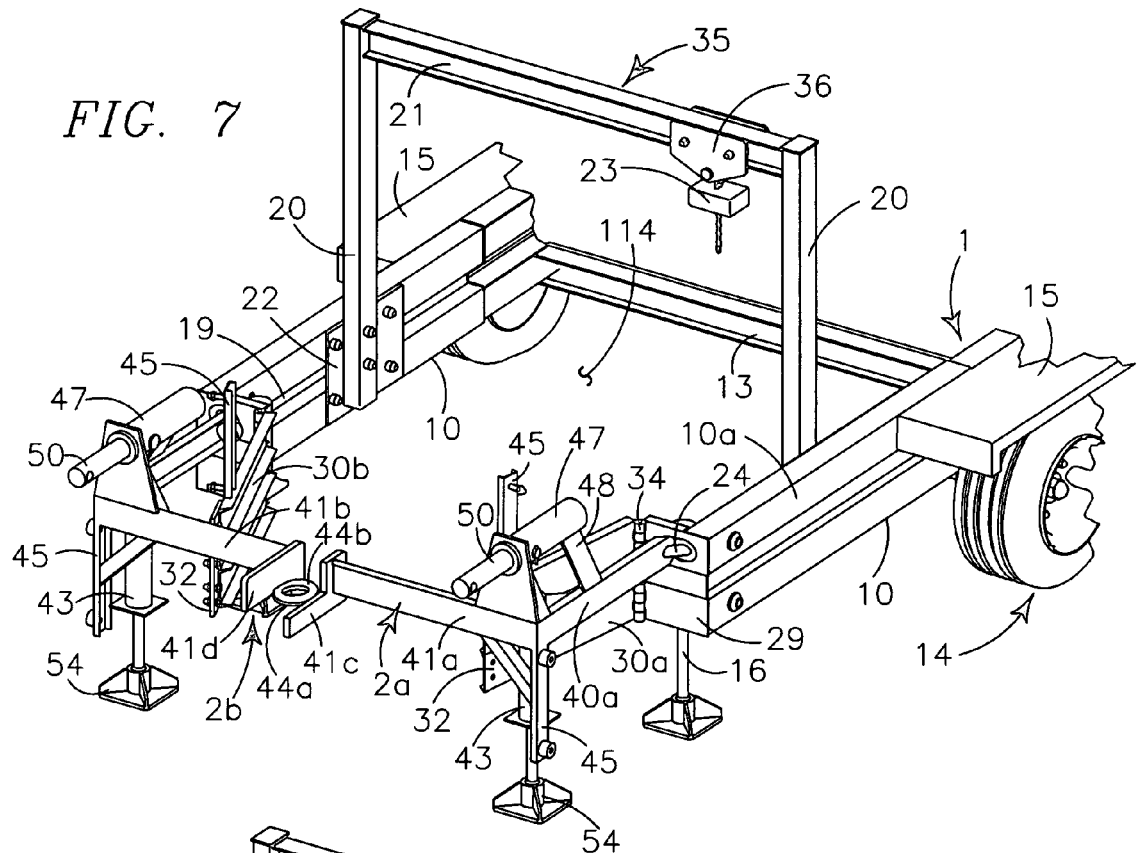
FIG. 7 is a partial rearward looking top and left side isometric view of a first embodiment of pivotal tow bar assembly for the utility trailer in a deployed worksite configuration.
FIG. 8 is a partial rearward looking top and left side isometric view of the tow bar assembly of FIG. 7 in a towing configuration.

As shown in FIGS. 1-9, and particularly in FIGS. 7 and 8, the first preferred embodiment of forward structural support for frame 1, as seen in towing configuration in FIG. 8, provides two similar opposed hinge mounts 29 each having laterally outer first end portions structurally carried by the forward end portions 10a of each side beam 10 with second inner end portions extending inwardly perpendicularly to side beams 10 and toward the elongate medial line of frame 1. Hinges 34 are structurally carried at the second inner end portion of each hinge mount 29 to carry transverse members 30 extending transversely inwardly approximately to the elongate medial line of the frame 1.

Locking brackets 32 (FIG. 7) having opposed mating portions are carried at the inner end portions of transverse members 30 distal from hinges 34 to secure the adjacent inner end portions of transverse members 30 to each other to provide a rigid forward end portion for the frame 1 while the utility trailer is in towing configuration.

Tow bar assembly 2 in the first preferred embodiment shown in FIGS. 7 and 8 is formed by similar opposing portions 2a and 2b each having laterally inner legs 41a and 41b and laterally outer legs 40a and 40b structurally joined to form "L" shaped portions having a vertex at a laterally medial position.

Compound tow ring 44 is formed by similar upper ring 44a and lower ring 44b each respectively carried by interfitting end plates 41c and 41d supported on the adjacent end portions of laterally inner legs 41a and 41b respectively. Upper half 44a and lower half 44b of the tow ring 44 interfit with one another to form a single tow ring 44 to releasably connect tow bar assembly 2 of the utility trailer to pintle hook 115 or a like structure of a towing vehicle 6.

Angulated pin hinges 24 pivotally connect the laterally outer end portions of each laterally outer leg 40a,40b to hinge mounts 29 at forward end portions of each side beam 10. Angulated pin hinges 24 permit tow bar members 2a,2b to pivot upwardly and forwardly from the towing configuration illustrated in FIG. 8 to the working configuration illustrated in FIG. 7 to form a protective perimeter at forward end of frame 1 between side beams 10, and adjacent the rear portion of towing vehicle 6. The vertex portion of each tow bar portion 2a,2b carries gussets 42 which in turn carry vertically adjustable stabilizing leg 43 having foot plate 54 at its outer end portion. Fastening brackets 45 are structurally connected to each laterally inner legs 41a,41b adjacent the vertex portions to extend upwardly perpendicular to laterally inner legs 41a,41b and laterally outer legs 40a,40b to receive nut/bolt combinations therebetween to secure tow bar portions 2a,2b to each other while utility trailer is being towed.

Energy attenuating pistons 47 carrying movable piston rods 50 are structurally carried on laterally outer legs 40a,40b of each tow bar assembly 2 by piston supports 48. When the utility trailer is deployed in a worksite configuration, movable pistons 50 may be extended forwardly so that forward ends of pistons 50 are in direct physical contact with the rear end portion of towing vehicle 6 to aid in preventing collapse of the forward boundary of the work area if utility trailer is impacted from behind by an errant vehicle.

As shown in FIGS. 5 and 6, mounting plate 28 is carried at rearward end of the utility trailer on rearmost cross beam 12. An "L" shaped attenuator platform 3 formed by vertical element 60 and horizontal element 61 is structurally carried on the rearward side of the mounting plate 28 by releasable fasteners (not shown). Pivotal ramp 62 is carried on the rearward edge of horizontal member 61 of the attenuator platform 3 by elongate piano hinge 63 to facilitate loading and unloading of impact attenuator 5 onto and off attenuator platform 3.

As shown in FIGS. 1-3 two laterally spaced mounting brackets 64 are structurally carried on the rearward surface of vertical element 60 of attenuator platform 3, spacedly adjacent its lateral outer edges, to interconnect the forward end of rearwardly extending telephone extension linkage 4 by means of bolt type axles 66 extending therebetween. Telephone extension linkage 4 is formed by plural pairs of similar cross links each pair having two elongate elements 70 pivotally connected to one another at a medial position by bolt type connector 72 extending therebetween. Each elongate element 70 of each pivotally jointed pair is pivotally interconnected at its end portions to the end portions of each elongate element 70 of each pivotally joined adjacent pair of elongate elements by bolt type connectors 73 extending therebetween.

Lower forward ends of elongate elements 70 adjacent to attenuator platform 3 are interconnected to mounting brackets 64 by bolt type axles 66 extending therebetween and upper forward ends of elongate elements 70 are connected to each other by horizontal beam 74 extending therebetween.

Protuberances 75 extend laterally outwardly from bolt type connectors 73 connecting the end portions of each adjacent pair of elongate elements 70 forming the crosslinks to provide fastening points for annular tensioning bands 76 formed of elastic material such as rubber or elastomeric polymers. The tensioning bands 76 are positioned about pairs of vertically adjacent protuberances 75 when the telephone extension linkage 4 is extended. The annular tensioning bands 76 bias the telephone linkage 4 to an extended position.

The rearward pair of cross-links most distant from attenuator platform 3 are interconnected with energy absorbing impact attenuator 5 of known construction to reduce energy transfer to the utility trailer through controlled collapse and inertial and frictional deceleration. Similar opposed vertical slide element 85 carried at the forward portion of each lateral side of attenuator 5 each define oblong vertically oriented slot 86 to receive rollers 87 carried at the upper end portions of rearmost elongate elements 70 to engage with oblong vertical slots 86 to movably interconnect the elongate elements 70 to vertical slide members 85 of the impact attenuator 5. Releasable connectors 89 extend through orifices in the lower end portions of rearmost elongate elements 70 and lower portion of vertical slide element 85 to provide lower pivotal interconnections for telephone extension linkage 4 to impact attenuator 5.

Figure 4:
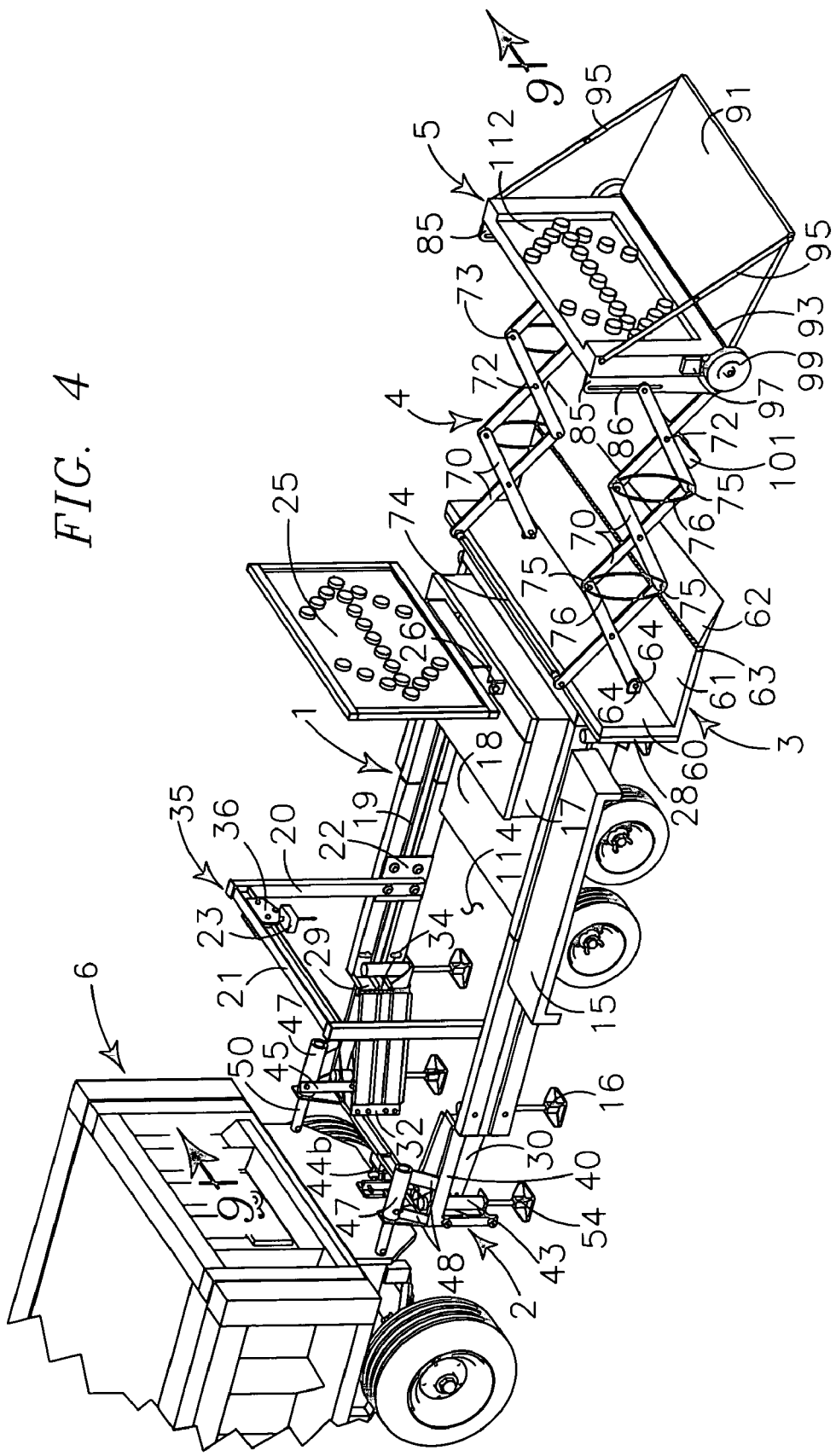
FIG. 4 is a forward looking top and left side isometric view of the utility trailer of FIG. 3.

Pivoting ramp 91 is carried adjacent the lower rearward edge of impact attenuator 5 by hinge 93 (FIG. 4). Foldable ramp closing members 95 communicate from the rearward portion of each lateral edge of pivoting ramp 91 forwardly and upwardly to the upper portion of each adjacent vertical side element 85 of impact attenuator 5 to support ramp 91 and secure it in a raised position.

Paired opposed wheel mounting brackets 97, each carrying elongately aligned wheel 99, are carried by the impact attenuator 5 adjacent the lower edges of each side. The wheel mounting brackets 97 are spring biased downwardly to support impact attenuator 5 upon wheels 99 unless weight is added to ramp 91. Addition of weight on ramp 91 overcomes the spring biasing to lower the impact attenuator 5 onto an underlying supportive surface such as a street surface.

As shown in FIGS. 5 and 6, laterally spaced mounting brackets 102 are structurally carried on the forward surface of impact attenuator 5 inwardly adjacent the vertical slide members 85. Each mounting bracket 102 pivotally carries a underlying surface penetrating elements 101 which is configured and positioned to contact the surface underlying the impact attenuator 5 to resist forward motion if the impact attenuator 5 is impacted from behind by a vehicle.

A second lighted information and traffic directional indicator panel 11 2 (FIG. 4) may be carried by impact attenuator 5 on its rearward side.

As shown in FIGS. 10 and 11, a second embodiment the tow bar assembly 2c of my utility trailer does not pivot but is fixedly mounted. The second species provides forwardly and inwardly angulated tongue beams 200a,200b structurally connected to each other at forward end portions and structurally connected at rearward end portions to the forward end portions 10a of side beams 10. Tow ring 44 is structurally carried at the vertex of the angulated tongue beams 200a,200b to extend forwardly for releasable attachment to pintle hook 115 of a towing vehicle 6.

The second embodiment of the tow bar assembly 2c provides structural support between the utility trailer and towing vehicle 6 by means of laterally spaced compound extendable struts 203,204 pivotally carried by opposed strut brackets 201 which are carried at laterally outer rearward portions of each tongue beam 200 adjacent the forward end portions 10a of side beams 10. Each strut bracket 201 carries strut axle 202 extending vertically therethrough to pivotally fasten inner strut member 203, which in the instance illustrated is a box beam that pivots on strut axle 202. Plural spaced locking pin holes 206 are defined to extend in vertical orientation through inner strut member 203 to receive the inwardly extending portion of locking pin 205. Extendable strut member 204 is a box beam defining medial channel 207 extending therethrough configured to slidably carry inner strut member 203 in the internal channel 207. Locking pin 205 is carried by extendable strut member 204 spacedly adjacent the rearward end portion to extend vertically through medial channel 207 and be received in locking pin holes 206 defined in inner strut member 203 to adjustably fasten the strut members 203,204 in a desired combined length. The locking pin 205 is preferably releasably fastenable in an inward locking position.

As shown in FIG. 10 when the second embodiment of the tow bar assembly is in a towing configuration, extendable strut members 204 are positioned inwardly on inner strut members 203 and secured in place by locking pins 205. The extendable strut members 204 are pivoted inwardly and rearwardly on strut axle 202 to a position immediately adjacent tongue beams 200a,200b respectively and preferably secured in position by known means (not shown).

As shown in FIG. 11 when the second embodiment 2c of the tow bar assembly is deployed in worksite configuration, inner strut members 203 and extendable strut members 204 are pivoted outwardly and forwardly parallel to side beams 10 and extendable strut members 204 are extended forwardly to contact the rear portion of a towing vehicle 6. Locking pins 205 are engaged in appropriate locking pin holes 206 defined in inner strut member 203 to maintain the strut member configuration.

The utility trailer, the safety barrier or both may carry a motor and generator to power the lighted traffic information and directional indicator panels 25,112 if the utility trailer is not powered from the electrical system of a towing vehicle 6.

Having described the structure of my utility trailer and safety barrier, its operation may be understood.

A towing vehicle 6, such as a dump truck, tows the utility trailer and safety barrier to a location where a street repair is to be performed and stops a spaced distance before reaching the repair site. The lighted information and traffic directional indicator panel 25 is rotated upwardly, secured in position by the locking mechanism 27 and activated. Lighted traffic directional indicator panel 112 carried by impact attenuator 5 is activated. Pivotal ramp 62 on attenuator carrying platform 3 is pivoted downwardly and the impact attenuator 5 is moved rearwardly off of platform 3 onto the supporting roadway surface. Ramp 91 is pivoted onto the supporting roadway surface and the towing vehicle 6 is moved forwardly, pulling the utility trailer away from the deployed impact attenuator 5. As the towing vehicle 6 and utility trailer move away from the impact attenuator 5 the telephone extension linkage 4 extends. The towing vehicle 6 stops with the forward end portion 10a of frame 1 positioned over the repair site. Alternatively, after the towing vehicle 6 stops with forward end portion 10a of frame 1 over the repair site, horizontal beam 74 of the telephone extension linkage 4 may be moved downwardly and forwardly to move the impact attenuator 5 rearwardly away from attenuator platform 3. The leveling jacks 16 are extended to support and level the utility trailer and annular tensioning bands 76 are positioned on protuberances 75 on the interconnected pairs of cross-links of the telephone extension linkage 4.

If using the first embodiment of my utility trailer, bracket 32 securing transverse members 30a,30b to each other is disengaged. Bracket 45 securing tow bar members 2a,2b to each other is also disengaged to allow tow bar members 2a,2b to rotate upwardly and forwardly to form a rectangular perimeter around the work area. Stabilizing legs 43 are extended and movable piston 50 is extended forwardly so that it touches the rear portion of the towing vehicle 6. Transverse members 30a,30b are pivoted forwardly to increase the amount of work area available.

If using the second embodiment of my utility trailer, the known fastening means (not shown) securing the extendable strut members 204 and inner strut members 203 to the tongue beams 200a,200b are released. The strut members 203, 204 are pivoted forwardly and laterally outwardly to a position parallel to side beams 10. Locking pins 205 are withdrawn and extendable strut members 204 are moved forwardly on inner strut members 203 until forward end portions of the extendable strut members 204 contact, or comes into close proximity to, the rear portion of towing vehicle 6. Locking pins 205 are replaced so that they engage in one of locking pin holes 206 defined in inner strut member 203 to secure the extendable strut members 204 in place.

Repair of the road surface may then commence inside the perimeter of the protected work area which provides access to the rearward deck 18 and bed portion of the towing vehicle for tools, supplies, materials, equipment and storage for by-products and waste. If necessary, hoist arch 35 and hoist 23 may be employed to move or aid in moving heavy objects.

When the road repair is complete, the above steps are generally reversed and conclude with the towing vehicle backing the utility trailer up to the impact attenuator 5 to responsively cause the telephone extension linkage 4 to contract. Ramp 91 carried by impact attenuator 5 is raised and the impact attenuator 5 is moved onto attenuator platform 3. Once the impact attenuator 5 is secured in place, the lighted traffic directional indicator panels 25,112 are deactivated and secured. The towing vehicle and attached utility trailer and safety barrier may then be moved to the next repair site.

The foregoing description of my invention is necessarily of a detailed nature so that specific embodiments of its best known modes might be set forth as required, but it is to be understood that various modifications of detail, rearrangement and multiplication of parts might be resorted to without departing from its spirit, essence or scope.

Having thusly described my invention, what I desire to protect by Letters Patent and

What I claim is:

1. A utility trailer and safety barrier movable by a towing vehicle comprising in combination:
   a frame having opposed parallel side beams, each side beam having a first forward end portion and a second rearward end portion, the frame carrying at least one wheel truck to support the utility trailer for locomotion, and having an open bottom work area in the forward end portion of the frame, a deck at a medially rearward position and a transport platform at the rearward end portion of frame, the transport platform having an "L" shaped configuration to carry mounting brackets for a telephone extension linkage and support a deployable impact attenuator;
   hitching means at the forward end portion of the frame for releasably connecting a towing vehicle, the hitching means providing a perimeter around the open bottom work area at the forward end portion of frame;
   telephone extension linkage having plural pairs of pivotally interconnected cross link members with at least one end of each forward pair of cross-link elements pivotally connected to the mounting brackets of the transport platform, and both ends of the rearward pair of cross-link elements opposite the transport platform pivotally connected to a deployable impact attenuator having wheels to facilitate movement to and from the transport platform;
   at least one lighted traffic information and directional indicator panel carried by the utility trailer;
   a hoist arch having an upper horizontal member supported by similar opposed depending vertical members each supported on a roller carriage carried by laterally opposed rails carried on the inner sides of each side beam and extending from the forward end portions of the side beams rearwardly to the rearward deck to provide elongate motion of the hoist arch relative to the utility trailer frame; and
   a hoist carried by upper horizontal beam of the hoist arch for motion transversely along the upper horizontal beam.

2. A utility trailer and safety barrier movable by a towing vehicle, comprising in combination:
   a frame having opposed parallel side beams interconnected by perpendicular crossbeams, each side beam having a forward end portion and rearward end portion to define an open bottom work area in the forward portion of the frame, the frame carrying
      a wheel truck to support the utility trailer for locomotion,
      a rearward deck supporting a cargo container for storage and transport of supplies and equipment, the cargo container carrying a traffic information and directional indicator,
      plural leveling jacks carried by the frame to provide positional stability for the utility trailer when in working mode,
      an elongately movable hoist arch having an upper horizontal member supported by two vertical members, structurally depending from opposing end portions of the upper horizontal member and supported at lower end portions on similar roller carriages engaged with hoist arch rails carried by the side beams, and
      a hoist movable along upper horizontal beam;
   a tow bar assembly pivotally carried by the forward end of the frame, and having two opposed "L" shaped members each having a transverse leg, and a perpendicular elongate leg, forming a vertex therebetween, the outward end of each transverse leg communicating with an angulated binge carried by frame for pivotal motion of the vertex of each "L" shaped member forwardly and outwardly to form a rectilinear perimeter around the forward portion of the open bottom work area at the forward end portion of frame each tow bar assembly member having
      a forward portion of the elongate leg of each "L" shaped member carrying a portion of a compound forwardly extending tow ring,
      an energy attenuating piston carried on each transverse leg of each tow bar member, said energy attenuating piston extendable substantially into contact with rear portion of the towing vehicle when tow bar members are in worksite configuration, and
      stabilizing legs carried at vertex portions of each tow bar portion to depend therefrom to level and positionally stabilize the tow bar when in worksite configuration;
   a transport platform at rearward end of the frame, said transport platform having an "L" shaped configuration and carrying paired opposed mounting brackets on a rearward surface for a mounting telephone extension linkage and a pivoting ramp on a rearmost lower edge to facilitate loading and unloading of a deployable impact attenuator;
   telephone extension linkage pivotally carried by the mounting brackets, said telephone linkage,
      comprising plural pairs of elongate elements pivotally interconnected with each other at a medial position and each pair pivotally interconnected at end portions with each adjacent pair of elongate members, and
      having protuberances extending laterally from each pivotal connection at end portions of each adjacent pair of elongate elements, said vertically adjacent protuberances carrying annular bands of elastic material to bias the telephone extension linkage to an extended position; and
   a deployable impact attenuator pivotally carried at the ends of the rearwardmost pair of telephone extension linkage elements, said impact attenuator having,
      depending wheels carried on wheel mounts biased to support the impact attenuator above an underlying supporting surface,
      a pivotal ramp on the rearward side of the impact attenuator extending angularly downward in a rearward direction to provide leverage to overcome the bias of the wheel mounts when predetermined weight is added to the ramp, and
      plural underlying surface penetrating protuberances pivotally attached to mounting brackets on the forward side of the impact attenuator to penetrate the underlying surface if the attenuator is impacted from behind.

* * * * *